Rollin A. Reynolds,
INVENTOR.

BY Paul A. Weilein
Attorney

Dec. 21, 1965  R. A. REYNOLDS  3,224,338
METHOD OF AND MEANS FOR CONTROLLING THE REMOVAL
OF MATERIAL WITH A CUTTING TOOL
Filed April 3, 1961  2 Sheets-Sheet 2

Rollin A. Reynolds,
INVENTOR.

BY Paul A. Weilein
Attorney

United States Patent Office 3,224,338
Patented Dec. 21, 1965

3,224,338
METHOD OF AND MEANS FOR CONTROLLING THE REMOVAL OF MATERIAL WITH A CUTTING TOOL
Rollin A. Reynolds, Palos Verdes, Calif., assignor to Dyna Systems Inc., Torrance, Calif., a corporation of California
Filed Apr. 3, 1961, Ser. No. 100,049
6 Claims. (Cl. 90—11)

The present invention relates generally to improvements in the art of removing material from a work piece or the like by means of a cutting tool, and constitutes improvements in the invention disclosed in my pending application entitled Motor Control System and Torque Indicating Means, Serial No. 14,615, filed March 14, 1960.

The invention is especially useful and embodies many inherent advantages which are most highly desirable in connection with the operation of machines and apparatus for threading, tapping, drilling, milling and similar procedures in which materials are removed by a cutting tool operating on a work piece. Such machines and apparatus are in general characterized by the use of a tool having a cutting edge which is linearly or rotatably relatively moved over the work piece, and wherein, by the application of suitable pressure, is caused to operate at a predetermined cutting depth and remove the material usually in the form of chips.

Heretofore, machines of the above character have been extremely limited with respect to the materials and machining operations which may be carried out on such materials. In this connection, such machines may be economically used only with materials which are susceptible of cutting by means of a usually available cutting tool. With the more recently developed extremely hard materials, it has in some cases been practically impossible to maintain the materials of the work-piece, and in others only by the utilization of the most expensive of tools has it been able to machine some of these more recent materials, and even then the tools are very short lived due to becoming dull, burning up, or other inherent undesirable effects of operation.

From the exhaustive study and analysis of the presently known conventional procedures, it has been determined that the inability of the conventionally available apparatus and equipment to solve the problem is primarily due to the previous lack of appreciation of and failure to realize the importance of properly controlling the operative relationship between the driving torque, pressure for maintaining proper depth of cut, and the speed of cutting.

Under conventional machining practice, an operator selects a speed at which he thinks the particular material should be cut. There are no means for controlling the delivered torque, and as the tool pressure is increased to take a cut of greater depth, the tool does more and more work up to the point where it burns up. The present invention envisions an improved method for removing material in which the work factor remains substantially constant as a result of operating the tool so as to substantially conform to a speed-torque curve, wherein the speed and torque vary inversely. That is, as the torque is increased, the speed is decreased, and vice-versa, in which a manner that the actual speed of the tool, expressed as a percentage of a preselected maximum speed, added to the actual force exerted on the tool, expressed as a percentage of a preselected maximum available force, is substantially constant. This actual speed and force relationship is herein referred to as a constant work output or constant work factor. By utilizing the present invention, it is possible by the selection of the proper values of speed and torque to remove material with a cutting tool even from metals which previously could not be machined, and to do so by the use of conventionally available standard tools.

With the foregoing in mind, it is one object of the present invention to provide an improved method for removing material with a cutting tool, wherein the speed and torque are inversely varied so as to maintain a substantially constant work output.

Since the primary factors of torque and speed, essential to the carrying out of the method of the present invention, are concomitants of the power means utilized for actuating the tool, it follows that a logical control of the torque and speed may be obtained through the control of the power means, especially if such power means is an electric motor.

A further object of the invention is therefore concerned with the provision of improved motor control which provides for a regulatory adjustment of the torque and speed so as to substantially conform to a speed-torque curve in which the speed and torque vary inversely in such a manner that the actual motor speed, expressed as a percentage of a preselected maximum speed, added to actual torque, expressed as a percentage of a preselected maximum speed, is substantially constant.

Another object is to provide a motor control system which permits a pre-setting of the torque and speed, but which is so arranged as to supply additional current to the motor armature by means of a gate control, when there is a call for increased torque.

A still further object is to provide a motor control system of the foregoing character which may be applied to a single motor cutting apparatus such as a drill press, as well as to a dual motor driven apparatus such as a milling machine.

Further objects of the invention will be brought out in the following part of the specification, wherein detailed description is for the purpose of fully disclosing the invention without placing limitations thereon.

Referring to the accompanying drawings, which are for illustrative purposes only:

Figure 1:
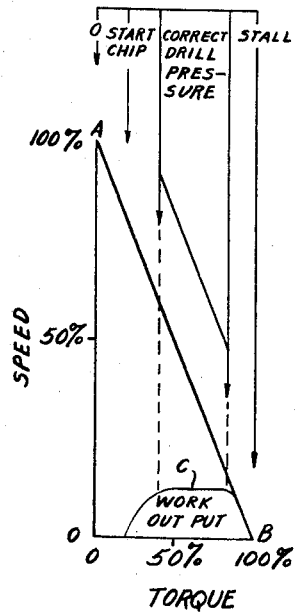
FIG. 1 is an operations curve illustrative of the method of the present invention for conditions of high speed-low torque.

Referring more specifically to the drawings, the basic concept of the method of the present invention, and the motor control system as used therein, will be described in connection with drilling apparatus, although it is to be clearly understood that the method and control may be applied to other types of material removing equipment utilizing a cutting tool.

The method of the present invention will be explained by reference to FIGS. 1 and 2, which graphically illustrate the cooperative relationship between the drill pressure, speed and torque, and which has produced an entirely new concept in this field. Practice of the method according to the present invention is made possible by the electrical means whereby the speed and torque of the power device, in this case an electric motor, may be so controlled that these factors will vary inversely along a line A–B, which indicates the conditions under which the tool must operate to prevent its destruction or work-hardening in the case of particular metallic materials. This is to say, torque and speed variations along the line A–B are accomplished by sensing changes in resistance to cutting encountered by the tool, i.e., the reaction load on the tool, and changing by such sensed changes the speed of movement of the tool relative to the material in a cutting direction.

The slope of the line A–B depends upon the size drill, tool or size of cut. In the case of FIG. 1, the curve represents a high speed-low torque condition of operation, such as pertains to hand tools and very small tools. The curve in FIG. 2 indicates high speed and high torque operation such as pertains to larger tools or drills. Such devices may also be operated at low speed and high torque.

The manner in which the curve or line A–B may be determined will now be explained. While it is possible to feed the drill by hand, it is preferable to utilize some form of power feed such as electric feed, hydraulic feed or other means, whereby the drill pressure may be held substantially constant and easily adjusted. Such means are well known in the industry. In addition it will be understood by those skilled in the art that the speed-torque line A–B involves the rate of movement and force applied to cause a cutting tool to be moved in a cutting direction relative to the material, i.e., the rate of and force with which a drill bit is rotated or the rate of and force with which a material carriage moves longitudinally relative to a non-moving linear cutting tool, as examples; while the feed or feeding movement between the material and the tool involves the application of a force in a different direction, i.e., the axial feed of a drill bit or the movement of a material carriage relative to a rotating cutter, as examples.

With the desired size drill, in the case of unknown material, a slight feed pressure is applied. By the utilization of the torque and speed controls, which will hereinafter be explained in detail, the operator sets a minimum for speed and torque in the material. The torque speed and feed pressure are then gradually increased to their maximum permissible value which will allow metal being removed at the maximum rate without generating excessive heat. By then stalling the spindle and reading the torque on a torque indicating meter, this reading will be indicated as 100% torque at point B on the graph. Now, by allowing the spindle to run free, the speed is indicated as 100% speed at point A on the graph. A line is then drawn between A and B, which indicates the conditions under which the tool must operate in order to prevent destruction or work hardening of materials such as in certain metals.

Figure 2:
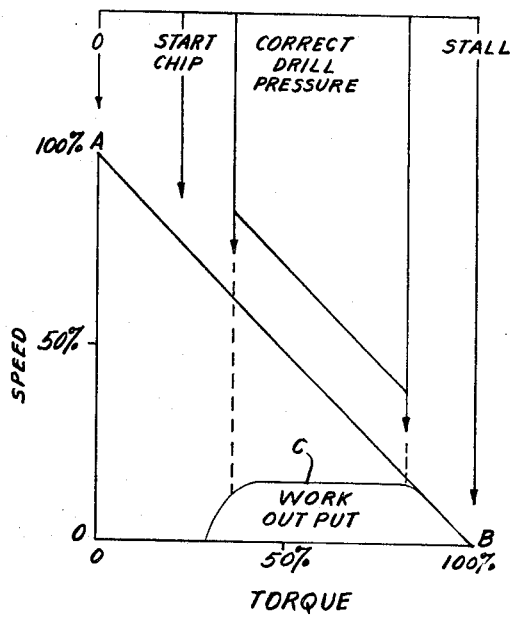
FIG. 2 is a similar curve to that of FIG. 1, except for conditions of high speed-high torque.

As shown in FIGS. 1 and 2, the work output is indicated by curve C, which it will be noted is substantially constant between the point where the chips start and where the motor stalls. By choosing the feed pressure at a substantially mid-point between these two conditions, operating conditions may be varied either upwardly or downwardly without damaging effects. Once the operating conditions are determined for a particular drill size and material, the control may be visually set or calculated for different sizes.

Figure 3:
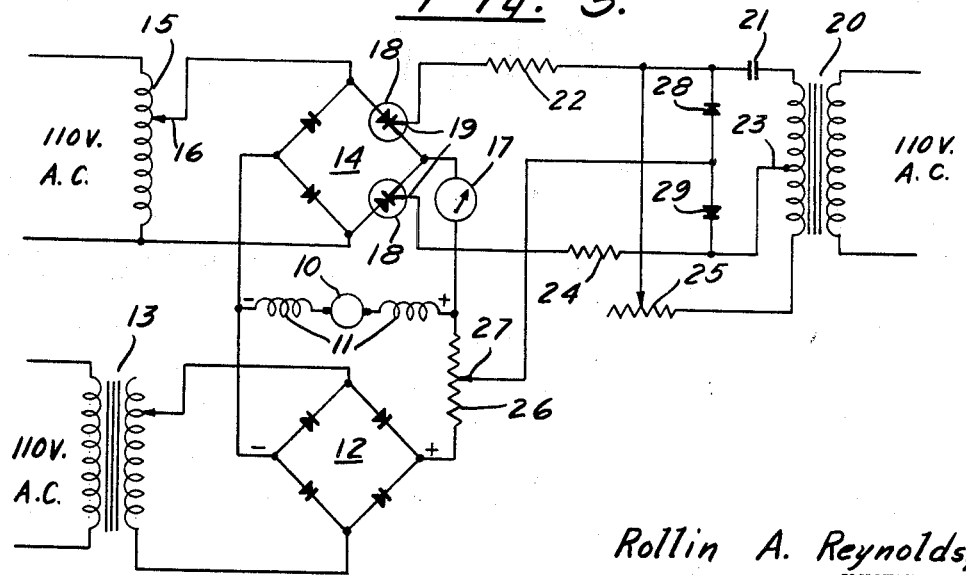
FIG. 3 is a schematic wiring diagram of a control system for driving a cutting tool, so as to obtain speed-torque relationships according to the method of the present invention for the conditions shown in FIG. 1.

Referring to FIG. 3, the control system for the electric motor power source for accomplishing the method under the conditions graphically represented in FIG. 1 will now be described. In this case, the driving motor comprises an armature 10 and field windings 11—11 connected in series. The motor terminals are connected to receive rectified pulsating direct current from the output side of a bridge rectifier 12 having its input connected to the output side of a suitable supply transformer 13.

Connected in parallel with the pulsating supply from the rectifier 12 to the motor terminals there is also provided a rectified pulsating direct current supply from the output side of a bridge rectifier 14 having its input connected to an auto-transformer 15 through an adjustable or slide contact 16, which permits the output of the rectifier to be adjusted for control of the motor torque. The rectifier output is shown as containing a torque meter 17 which gives an indication of torque and aids in adjustment of the torque factor for practicing the method of the present invention. Moreover, it will be observed that the rectifier 14 differs somewhat from the conventional bridge rectifier in that two legs of the rectifier 14 respectively contain an electronic switching device 18, such as commercially referred to as a silicon controlled rectifier. This device has a control or a gate electrode 19, by means of which current flow may be controlled through the device in a manner well known in the electronic art.

Gating current is supplied to the gate electrodes 19 from the secondary winding of a supply transformer 20, one end of the secondary winding being connected through a capacitor 21 and current limiting resistor 22, with one of the gating electrodes. A center tap connection 23 is connected through a current limiting resistor 24 to the other gate electrode. The other end of the secondary winding is connected through an adjustable resistor 25 which forms with the capacitor 21 an R-C network which serves to provide an adjustable phase angle between the triggering or gating current and the pulsating direct current from the torque control rectifier 14.

A balance resistor 26 in the positive output connection of the rectifier 12 to the motor terminals provides a source of potential for triggering the electronic switching devices 18. A slide contact 27 associated with the resistor 26, is connected through respective diodes 28 and 29 to the feed sides of resistors 22 and 24.

Briefly, the controls shown in FIG. 3 are initially adjusted at the transformer 13 to provide constant current and voltage to the armature and field circuit of the motor as a sensing source. The adjustment of the transformer 13 determines the minimum speed, but is not enough to turn the armature. With the transformer 15 adjusted to the desired torque value, the potential drop at the resistor 26 will act to trigger the electronic switching devices 18—18, and the motor will run at the minimum speed. By adjustment of the resistor 25, the phase shift of the gating current may be varied to obtain the desired speed for operation along the line A–B, as shown in FIG. 1.

Figure 4:
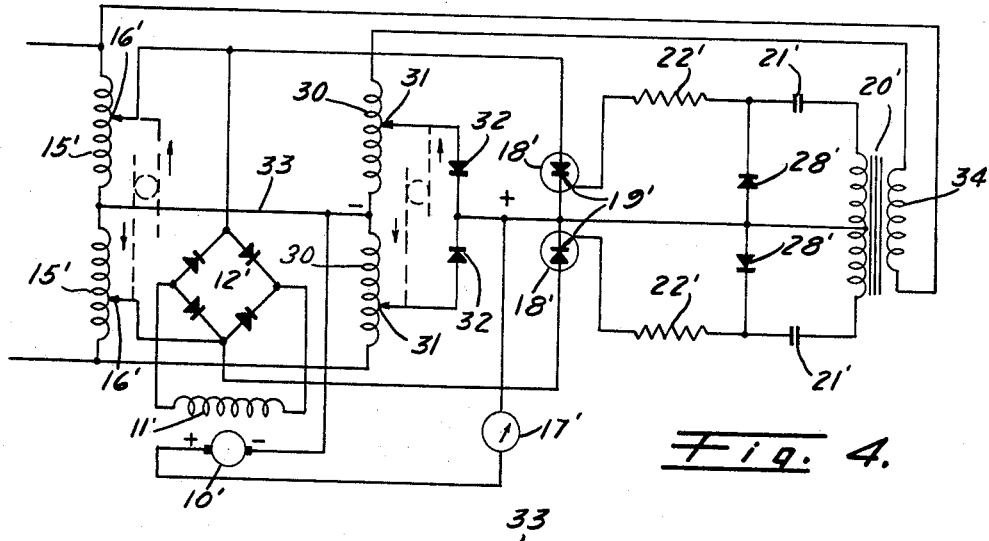
FIG. 4 is a schematic wiring diagram for a control system for obtaining the speed-torque conditions shown in FIG. 2.

Referring to FIG. 4 of the drawings, the difference over the arrangement of control used in FIG. 3 is primarily in that the motor field and motor armature are separately energized; and in the manner of sensing and shifting the phase relationship of the triggering current. The control arrangement as shown in FIG. 4 is utilized for the operating conditions particularly shown in FIG. 2 for the method. Elements in FIG. 4 similar to those of the control in FIG. 3, are indicated with corresponding numerals which are primed.

In this case, the motor field 11' is shown as being energized from a bridge rectifier 12' having its input connected with a pair of series connected auto-transformers 15', each of which has a slide contact 16'. The contacts 16'—16' are mechanically connected for gang operation in reverse directions. The adjustment of the contacts 16' similarly adjust the motor torque.

For controlling the speed of the motor, a pair of series connected auto-transformers 30—30 have their gang connected slide contacts 31—31 respectively connected to diodes 32—32, and thence through a torque meter 17' to one side of the armature 10' of the motor. The other side of the armature is connected to a bridging conductor 33 between the connected ends of the auto-transformers 15'—15' and the connected ends of the auto-transformers 30—30. Adjustment of the contacts 31—31 determines the speed setting for the motor. The auto-transformers 15'—15' feed also a parallel connected armature circuit, the slide contacts 16'—16' being respectively connected through electronic switching devices 18'—18' to the positive terminal of the armature.

In this case, provision is made for sensing a call for increased torque by providing a gating transformer 20' which has a primary winding 34 connected in series with the auto-transformers 30—30. Thus, with increased load current on the armature, triggering voltages will be applied to the gate electrodes 19'—19' to draw additional load current from the torque control auto-transformers 15'—15'. Since the torque control and speed control are independently adjustable for the motor, greater flexibility is obtainable for operation under the conditions disclosed by the graph in FIG. 2 for operation according to the method of the present invention.

Figure 5:
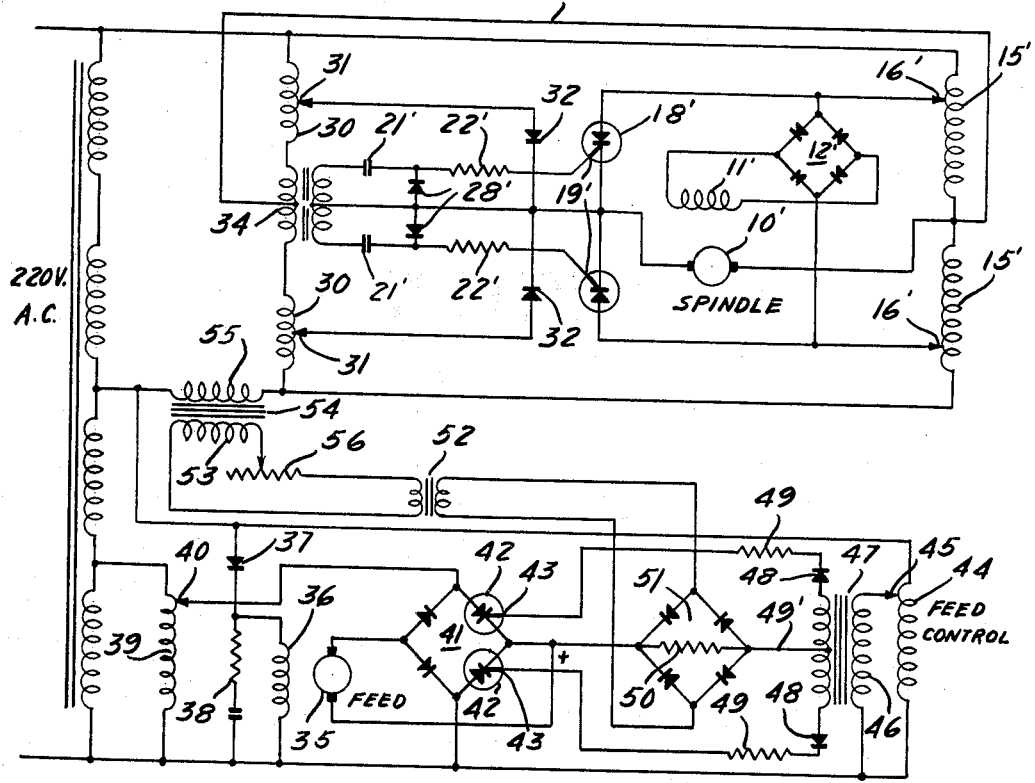
FIG. 5 is a schematic wiring diagram of a control system for practicing the method of the present invention in apparatus involving a plurality of electric driving motors.

As thus far described, the control has been utilized for a single motor, such as might be used for the driving of a drill press spindle. It will be appreciated, however, that such a spindle motor may be as a practical matter associated with a second motor such as the feed motor of a milling machine. In such arrangement, the operation of the spindle motor will in general be the same as that which may be obtained by the use of the control system shown in FIG. 4. In FIG. 5, the control system for the spindle motor has been combined and associated with the control for a second motor, namely a feed motor which in this case has an armature 35 and field winding 36. The field winding 36 is energized with rectified A.C. line voltage through a diode 37, the field winding being connected across a filter 38 in circuit with the diode 37. The armature is in this case energized from an auto-transformer 39 having a slide contact 40 whereby its output may be adjustably varied, this output being connected to supply a bridge rectifier 41 in this case. The output of the rectifier 41 is connected to the armature 35 of the feed motor. In this instance, two legs of the rectifier are provided with electronic switching devices 42—42 such as previously described. These devices each have a gating electrode 43. The feed control is adjustable by means of an auto-transformer 44, which is connected through a slide contact 45 with the primary 46 of an isolation transformer 47. The secondary of this transformer has its respective ends connected through a diode 48 and load-limiting resistor 49 to one of the gating electrodes 43.

The mid-point of the secondary winding of transformer 47 is connected by a conductor 49' to the positive terminal of the feed motor armature 35, this conductor containing a resistor 50 which bridges the output circuit of a bridge rectifier 51. The input of the bridge rectifier 51 is connected through an isolation transformer 52 with the secondary winding 53 of a transformer 54 having its primary 55 connected into the supply circuit for the spindle motor.

With the control system described above, energization of the feed motor will at the same time energize the auto-transformer 44 and result in triggering the electronic switching devices 42—42 to start the feed motor operation.

As the spindle motor load increases, there will be a feedback through transformer 54 into the bridge rectifier 51 and thus build up a potential across the resistor 50 in such direction as to oppose the motor feed current supplied through the switching devices 42 and force this current to a value which will cause these devices to be open circuited momentarily and thus regulate the feed motor. This will prevent overloading the spindle motor.

It is possible to adjust the point at which the feed motor will be regulated in relation to the load on the spindle motor by means of an adjustable resistor 56 placed in the output circuit of the secondary winding 53 of the transformer 54.

While the gate control from the auto-transformer 44 is adjustable to desired values, the supply of a gating signal may be connected to a current source which is responsive to an increased speed or torque of the spindle motor. Under said circumstances the resistor 56 may be used to regulate the tracking adjustment between the spindle and feed motors.

Various modifications may suggest themselves to those skilled in the art without departing from the spirit of my invention, and hence, I do not wish to be restricted to the specific forms shown or uses mentioned, except to the extent indicated in the appended claims.

I claim:

1. The method of removing material from a workpiece with a cutting tool driven by a power means, comprising the steps of; establishing a maximum speed of operation and maximum deliverable force for said power means; causing said power means to move said tool and said workpiece relatively in a cutting direction to remove material from said workpiece; sensing changes in the resistance to such cutting movement; causing said sensed changes to change the speed of movement of said tool in such manner that the actual speed of said tool, expressed as a percentage of said maximum speed, added to the actual force exerted on said tool, expressed as a percentage of said maximum force, is substantially constant.

2. The method of claim 1, comprising applying said force to cause rotation of said tool to move said tool in said cutting direction, and applying a feed force to effect relative feeding movement between said tool and said material; and also causing said sensed changes to change the rate of said feeding movement.

3. The method of claim 1, comprising applying said force to cause rotation of said tool to move said tool in said cutting direction, and applying a feed force to effect relative feeding movement between said tool and said material, and also causing one of said changes to change the rate of said feeding movement.

4. The method of claim 1, comprising applying said force to cause rotation of said tool to move said tool in said cutting direction, and applying a feed force to effect relative feeding movement between said tool and said material.

5. The method of claim 1 wherein said power means comprises an electric motor; said step of sensing changes in the force exerted by said power means being performed by detecting changes in the electrical operating characteristics of said motor, generating a signal representative of said change, and causing said signal to change the speed of said motor.

6. The method of claim 1, comprising applying said force to cause rotation of said tool in said cutting direction, and applying a feed force to effect relative feeding movement between said tool and said material, said power means comprising an electric motor; said step of sensing changes in the force exerted by said power means being performed by detecting changes in the electrical operating characteristics of said motor, generating a signal representative of said change, and causing said signal to change the speed of said motor, said feed force being applied by a second electric feed motor, and including the step of causing said sensed changes to change the speed of said feed motor to change the rate of said feed movement.

References Cited by the Examiner

UNITED STATES PATENTS

| | | | |
|---|---|---|---|
| 1,871,750 | 8/1932 | Shaw | 318—39 |
| 2,411,162 | 11/1946 | King | 318—39 |
| 2,649,646 | 8/1953 | Remmer | 318—39 |
| 2,708,260 | 5/1955 | Comstock | 318—332 |
| 2,741,936 | 4/1956 | Wohlfahrt | 77—3 |
| 2,809,338 | 10/1957 | Carlson | 318—432 X |
| 2,891,426 | 6/1959 | Martin et al. | 77—5 |
| 2,916,685 | 12/1959 | Genuit | 318—332 |

ORIS L. RADER, *Primary Examiner.*

MILTON O. HIRSHFIELD, *Examiner.*

UNITED STATES PATENT OFFICE
CERTIFICATE OF CORRECTION

Patent No. 3,224,338                   December 21, 1965

Rollin A. Reynolds

It is hereby certified that error appears in the above numbered patent requiring correction and that the said Letters Patent should read as corrected below.

Column 1, line 37, for "maintain" read -- machine --; line 64, for "which" read -- such --.

Signed and sealed this 17th day of January 1967.

(SEAL)
Attest:

ERNEST W. SWIDER
Attesting Officer

EDWARD J. BRENNER
Commissioner of Patents